United States Patent
Oliver et al.

(10) Patent No.: US 8,290,891 B2
(45) Date of Patent: Oct. 16, 2012

(54) METHOD AND APPARATUS OF DYNAMIC RULES INSERTION BY AGENTS

(75) Inventors: Ian Justin Oliver, Söderkulla (FI); Ora Lassila, Hollis, NH (US); Sergey Boldyrev, Söderkulla (FI); Sergey Balandin, Helsinki (FI)

(73) Assignee: Nokia Corporation, Espoo (FI)

( * ) Notice: Subject to any disclaimer, the term of this patent is extended or adjusted under 35 U.S.C. 154(b) by 659 days.

(21) Appl. No.: 12/484,842

(22) Filed: Jun. 15, 2009

(65) Prior Publication Data

US 2010/0318488 A1    Dec. 16, 2010

(51) Int. Cl.
*G06F 17/00* (2006.01)
*G06F 17/30* (2006.01)
(52) U.S. Cl. ............... 706/47; 707/705; 726/2; 726/26
(58) Field of Classification Search .............. None
See application file for complete search history.

(56) References Cited

U.S. PATENT DOCUMENTS

| | | | |
|---|---|---|---|
| 5,438,511 A | 8/1995 | Maxwell et al. | |
| 6,088,524 A | 7/2000 | Levy et al. | |
| 7,076,804 B2 * | 7/2006 | Kershenbaum et al. | 726/30 |
| 2006/0161965 A1 * | 7/2006 | Shelest et al. | 726/1 |
| 2007/0180258 A1 | 8/2007 | Broussard et al. | |
| 2008/0243794 A1 | 10/2008 | Tanaka et al. | |
| 2009/0030896 A1 | 1/2009 | Jensen et al. | |
| 2009/0077641 A1 | 3/2009 | Trevallyn-Jones | |
| 2009/0083840 A1 | 3/2009 | Jensen et al. | |

* cited by examiner

*Primary Examiner* — Alan Chen
(74) *Attorney, Agent, or Firm* — Ditthavong Mori & Steiner, P.C.

(57) ABSTRACT

An approach is provided for dynamic modification of inference rules and deduction engines in an information base. Authorized agents are allowed to insert, delete or modify inference rules and deduction engines dynamically by signing their input using an authorized signature. Additionally, the functionalities of dynamic modification of inference rules and deduction engines can be provided through a direct application programming interface (API).

20 Claims, 12 Drawing Sheets

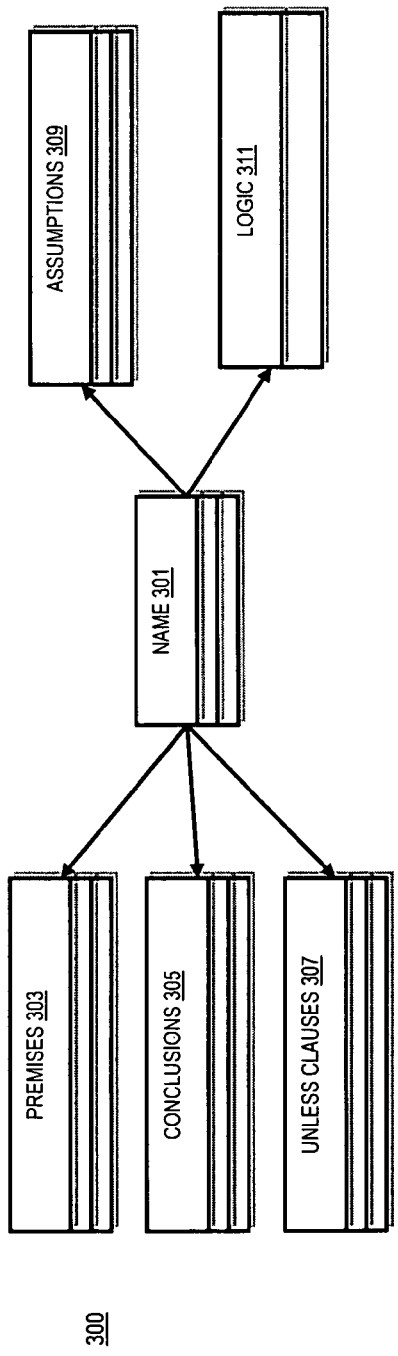
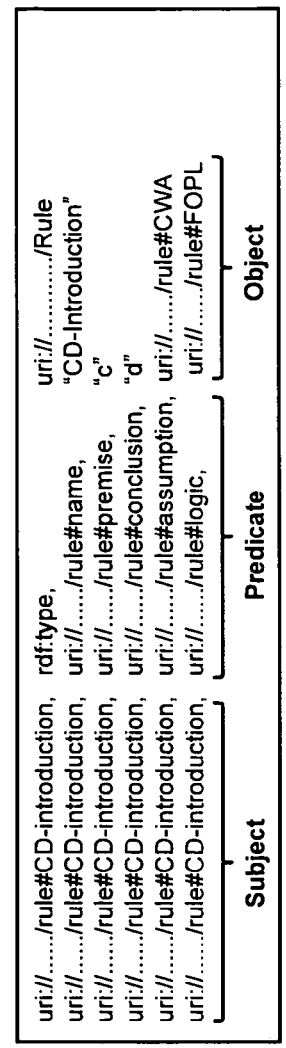
FIG.3A
FIG.3B
FIG.3C

METHOD AND APPARATUS OF DYNAMIC RULES INSERTION BY AGENTS

BACKGROUND

Large amount of information from various sources is readily available over the Internet and new sources of information are being introduced daily. The current trend has lead to a large combination of information bases that could be physically miles apart but contain information that need to be combined for accurate response to a request. In order for the user to be able to extract useful information that first, match as closely as possible with their requirements; and secondly is provided fast or within a minimal time delay, various strategies from the design of memories and access methods to database architecture design and inference rules and guidelines have been developed. In many occasions the information extraction rules need to be modified. For example, if information bases containing contradictory rules are combined, the contradiction issue needs to be addressed before user queries return wrong answers. Furthermore, modification of reasoning systems or deduction engines may be needed in order to achieve more accurate answers to queries imposed by information base users. Currently in the existing systems sets of deduction engines and inference rules are statically introduced in the system and any modifications must be performed by authorized system administrators. However, this process could slow down the information extraction process.

SOME EXEMPLARY EMBODIMENTS

Therefore, there is a need for mechanisms for dynamic modification of deduction engines and inference rules in an information base where the modification can be done when necessary. There is also a need for an authorization system so that only authorized agents are allowed to conduct the modifications.

According to one embodiment, a method comprises receiving a new inference rule or new deduction engine signed by an agent using a signature. The method also comprises validating the signature of the agent. The method further comprises dynamically inserting the new inference rule or the new deduction engine if the signature is valid.

According to another embodiment, an apparatus comprises a processor and a memory storing executable instructions that if executed cause the apparatus to receive a new inference rule or new deduction engine signed by an agent using a signature; validate the signature of the agent; and dynamically insert the new inference rule or the new deduction engine if the signature is valid.

According to another embodiment, an apparatus comprises means for receiving a new inference rule or new deduction engine signed by an agent using a signature. The apparatus also comprises means for validating the signature of the agent. The apparatus further comprises means for dynamically inserting the new inference rule or the new deduction engine if the signature is valid.

According to yet another embodiment, a computer-readable medium carries one or more sequences of one or more instructions which, when executed by one or more processors, cause an apparatus to perform at least the following: receive a new inference rule or new deduction engine signed by an agent using a signature; validate the signature of the agent; and dynamically insert the new inference rule or the new deduction engine if the signature is valid.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3C are diagrams of an inference rule structure, in accordance with one embodiment;

DESCRIPTION OF PREFERRED EMBODIMENT

A method and apparatus for dynamic modification of inference rules in an information system are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
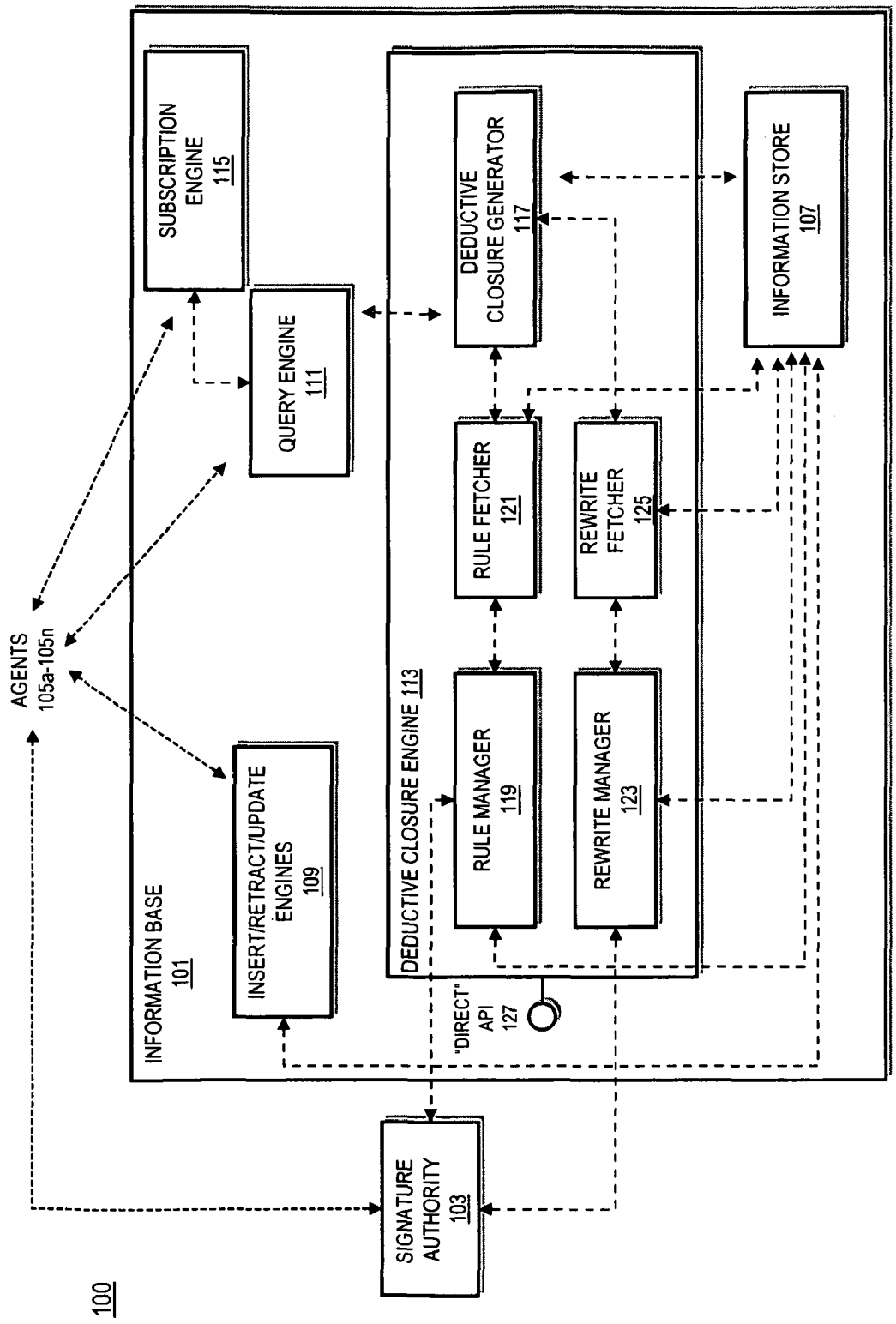
FIG. 1A is diagram of an information base capable of providing dynamic modification of deduction engines and inference rules, according to an exemplary embodiment.

FIG. 1A is diagram of an information base capable of providing dynamic modification of deduction engines and inference rules, according to an exemplary embodiment. As shown in FIG. 1A a system 100 comprises an information base 101, a signature authority module 103 and one or more agent(s) 105a-105n who can access the information base. Information base 101 comprises information storage 107 and components for creation, maintenance and updating information in information storage 107 as well as receiving queries and extracting answers from information storage 107 by applying a set of one or more inference rules that have been statically defined or entered dynamically by authorized agents 105a-105n.

In one embodiment, insert/retract/update engines 109 are responsible for assertion, removal and updating information within the information store 107 based on instructions given by one or more agent 105a-105n. Query engine 111 receives queries from agents 105a-105n processes and parses the queries. The parse procedure detects any errors that may exist in the query and reports back to the agent for correction. After receiving a modified query from agent, query engine 111 parses the query again and if it is syntactically correct, the query engine 111 passes the processed query to deductive closure engine 113.

According to one embodiment, subscription engine 115 is responsible for managing agent subscriptions to the information store 107. Query engine 111 will verify agent's subscription before processing their queries. A query received from an unsubscribed entity will be terminated by the query engine 111.

In one embodiment, deductive closure engine 113 includes components for extracting the information requested through a query from information storage 107 and passes the query result back to the query engine 111. Deductive closure generator 117 manages process of fetching information from information store 107 and application of inference rules to the fetched information.

Rule manager 119 monitors (or subscribes) the inference rules and possible changes to those rules in information store 107. Upon finding a new rule, rule manager 119 checks the signatures (if any) of the new rule to determine whether it is valid according to a signature authority 103. If new rule is unsigned or signed by an unauthorized signature, it is marked as invalid or it can be removed from the information store 107 for security reasons. If new inference rules have been signed by authorized signatures and are valid according to the signatures, it is inserted into the information store 107.

Upon receiving a query, rule manager 119 signals for the rule fetcher 121 to gather the rules required for answering the query. Rule fetcher 121 is responsible for fetching and locally storing of the set of rules that will be used by the deductive closure generators 117. Rule fetcher 121 can store the rules locally (i.e., caching) for performance reasons or can leave the rules in the information store 107 and access them directly whenever needed. Deductive closure generator 117 uses fetched rules to extract results to queries and return results to query engine 111 which passes the results to agent that originated the query.

In one embodiment, an agent 105a-105n with proper authorization can insert, retract or update deduction engines or reasoning systems that are used for extracting information from information store 107. The process of insertion, retraction and updating of deduction engines is similar to the one for inference rules. For this process, rewrite manager 123 is analogous component to rule manager 119 with the difference that rewrite manager 123 manages the loading and unloading of the deductive closure calculation engines 129a-129n of FIG. 1B which are components of deductive closure generator 117. Also rewrite fetcher 125 is analogous to rule fetcher 121 with the difference that rewrite fetcher 125 gathers and stores suitable deduction closure calculation engines 129a-129n of FIG. 1B required for query result extraction.

According to one embodiment, the design is targeted at managing the deductive closure engine 113 from the agents' 105a-105n perspective. A direct Application Programming Interface (API) 127 can be provided if necessary for integration with other components inside the information base 101. All functionality inside the deductive closure engine 113 can be provided through direct API 127.

Figure 1B:
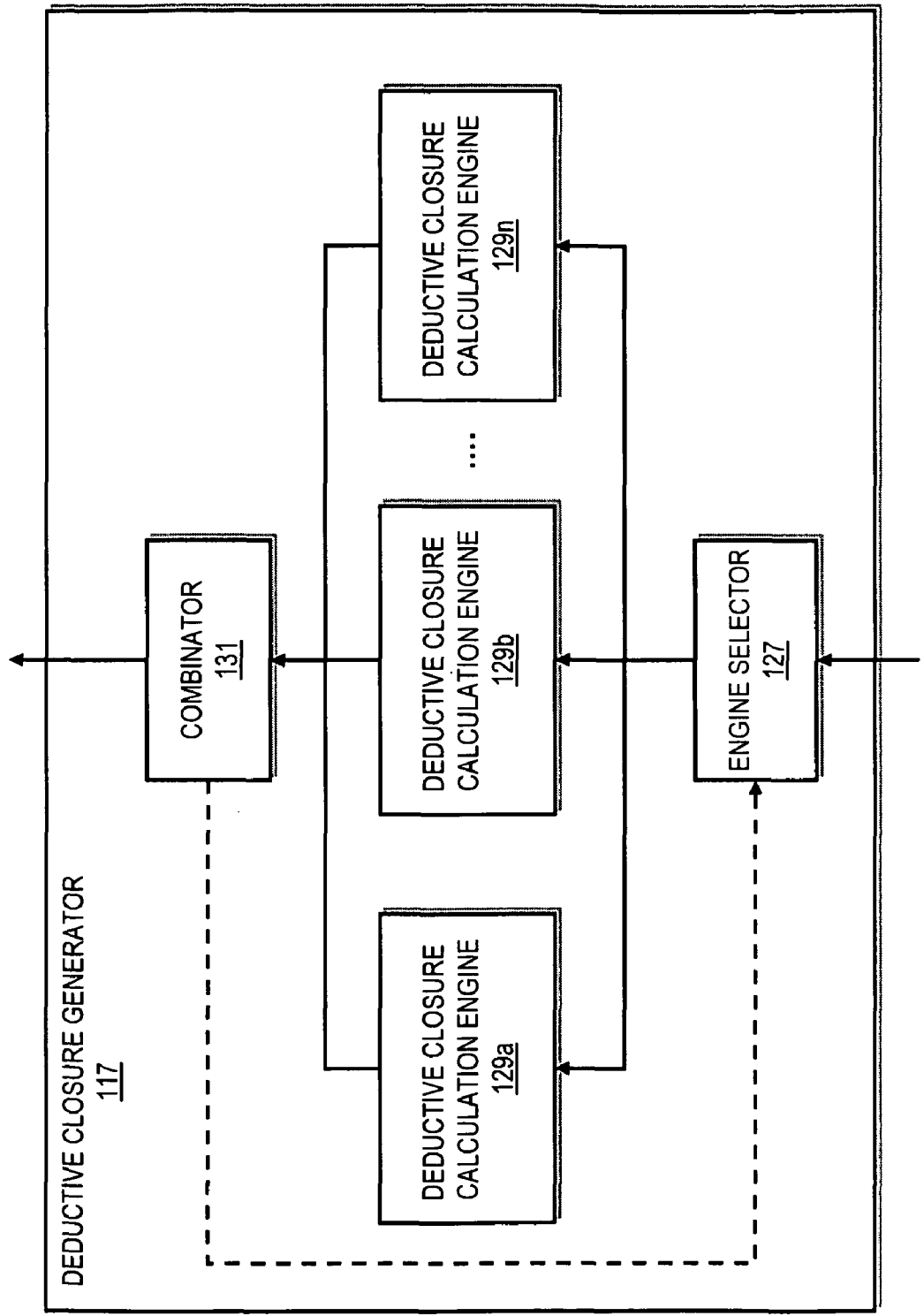
FIG. 1B is a diagram of a deductive closure generator a component responsible for generating query results based on reasoning systems provided through deduction engines available in an information base, in accordance with one embodiment.

FIG. 1B is a diagram of a deductive closure generator a component responsible for generating query results based on reasoning systems provided through deduction engines available in an information base, in accordance with one embodiment. In FIG. 1B, engine selector 127 receives a set of inference rules fetched by rule fetcher 121 and selects the correct deductive closure calculation engines 129a-129n depending on the properties of the inference rule currently being applied. In the case where no suitable deductive closure engine can be found for the given logic, engine selector 127 has the capability to find the next suitable deductive closure engine or discard the rule when no engine can be found. Discarding inference rules can also be achieved by explicitly contacting the rule fetcher 121 and dropping the rules from there.

Deductive closure calculation engines 129a-129n are individual processors which generate the deductive closure by applying the given rewrite rules to the information store 107. After the deductions by deductive closure calculation engines 203a-203n are completed, combinator 131 merges the results and then applies several checks on the combined result and, if necessary, forms a feedback loop to the engine selector 127 for another round of calculation. Otherwise, the result is returned to the query engine 111.

Figure 2A:
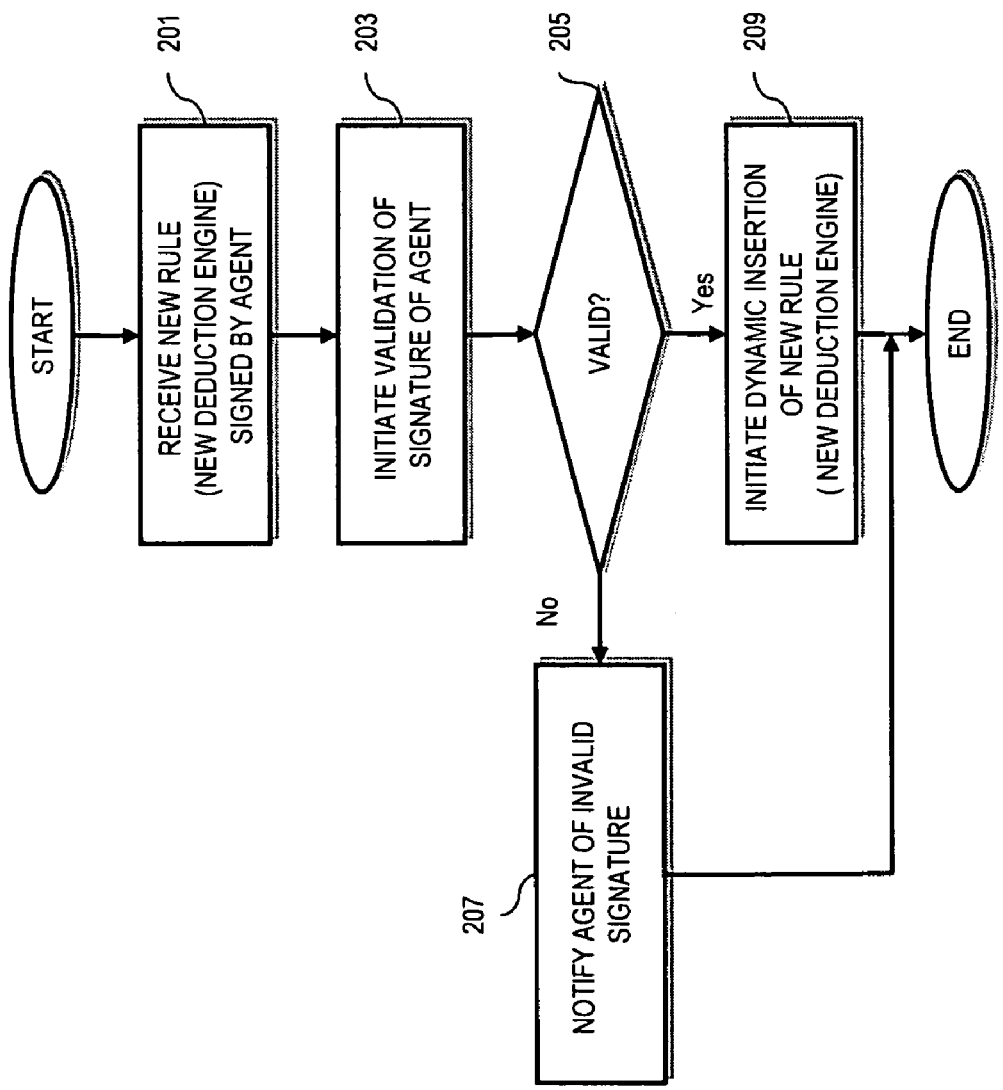
FIG. 2A is a flowchart of dynamic insertion of inference rules or deduction engines to an information base, in accordance with one embodiment.

FIG. 2A is a flowchart of dynamic insertion of inference rules or deduction engines to an information base, in accordance with one embodiment. In step 201 a new rule or a new deduction engine is received from an agent 105a-105n. Step 203 includes sending the agent's signature on the new rule or deduction engine to signature authorization 103 for validation. As in step 205 signature authorization 103 checked whether the signature is valid. If the new rule is signed by an unauthorized signature, in step 207 a message is sent to corresponding agent stating that the new rule cannot be inserted and the procedure ends. However, if the signature is valid, in step 209 the procedure for dynamic insertion of new rule or new deduction engine is performed as explained in FIGS. 1A and 1B.

Figure 2B:
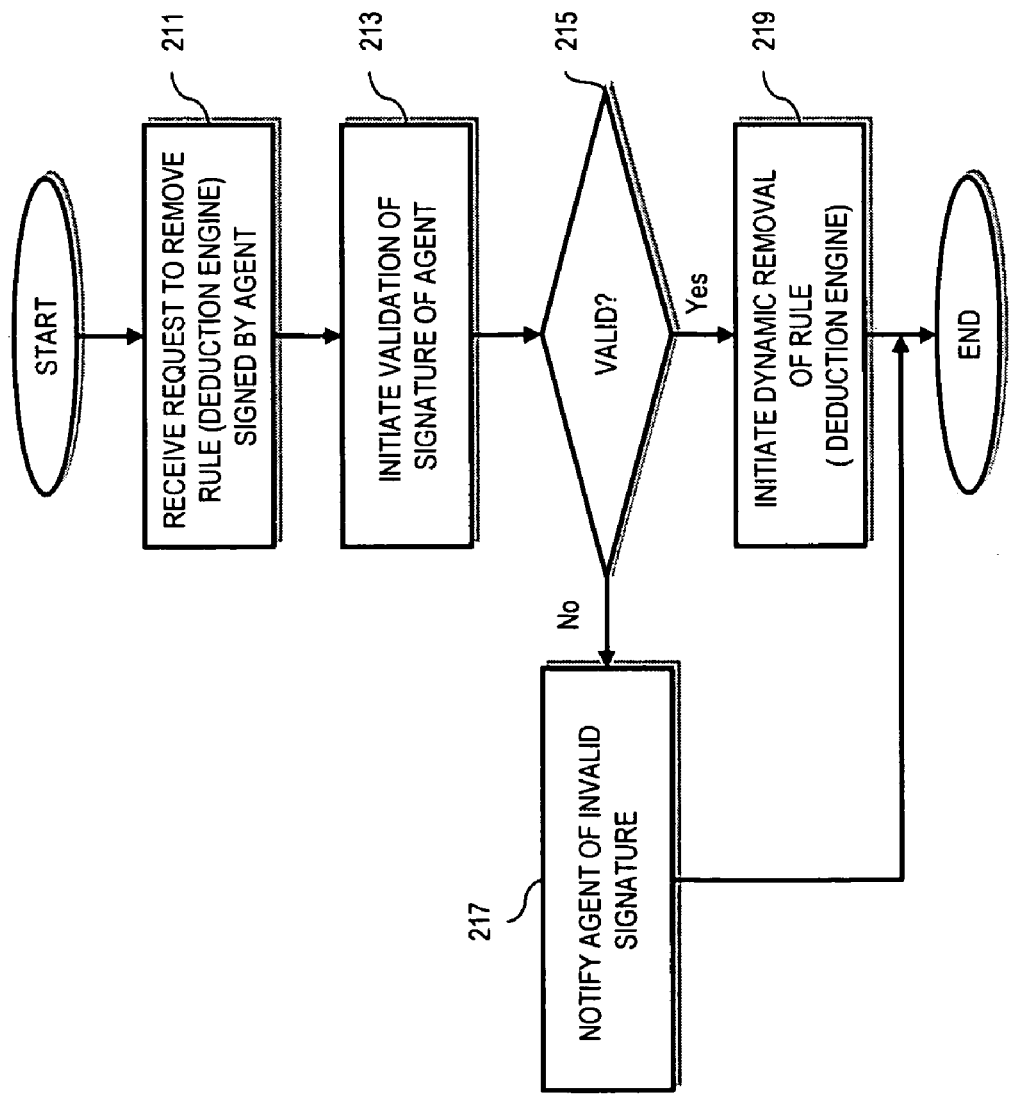
FIG. 2B is a flowchart of dynamic removal of inference rules or deduction engines from an information base, in accordance with one embodiment.

FIG. 2B is a flowchart of dynamic removal of inference rules or deduction engines from an information base, in accordance with one embodiment. Similar to FIG. 2A, in step 211 a request for removal of a rule or a deduction engine is received from an agent 105a-105n. Step 213 includes sending the agent's signature on the new rule or deduction engine to signature authorization 103 for validation. As in step 215 signature authorization 103 checked whether the signature is valid. If the removal request is signed by an unauthorized signature, in step 217 a message is sent to corresponding agent stating that their request cannot be processed and the procedure ends. However, if the signature is valid, in step 219 the procedure for dynamic removal of the rule or the deduction engine is performed as explained in FIGS. 1A and 1B.

Figure 2C:
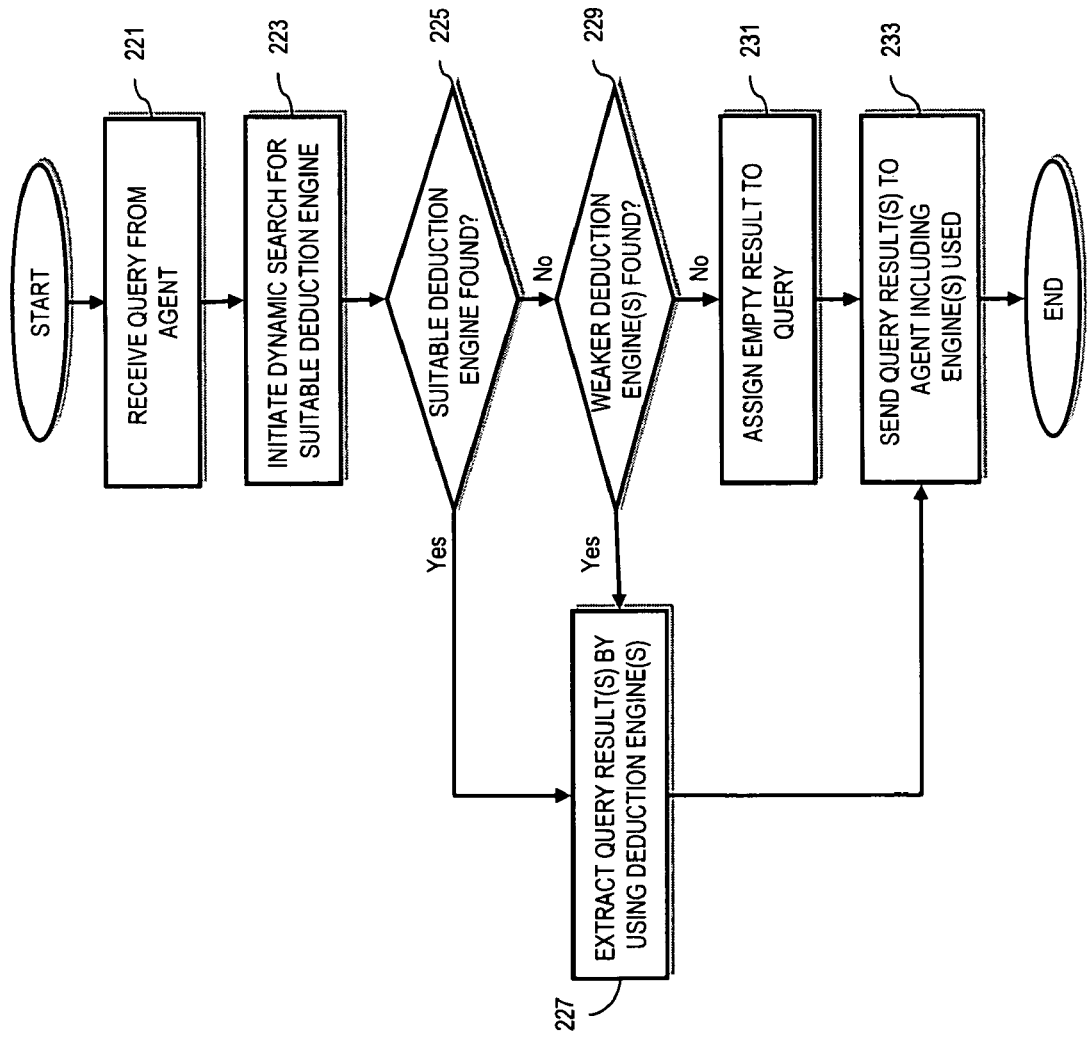
FIG. 2C is a flowchart of selecting a suitable deduction engine for answering a query from an information base, in accordance with one embodiment.

FIG. 2C is a flowchart of selecting a suitable deduction engine for answering a query from an information base, in accordance with one embodiment. In step 221 a query is received from an agent 105a-105n. The query engine 111 receives the query and passes it on to the deductive closer engine 113. As in step 223 the rewrite manager 123 asks the rewrite fetcher 125 to select the most suitable deduction engine for answering the query. If the suitable engine is found as in step 225, the process continues from step 227 where rule manager 119 requests rule fetcher 121 to collect rules needed for answering the query; otherwise if the rewrite fetcher 125 can find a weaker engine that could be used for answering the query as in step 229 again the extraction of query result continues from step 227. If more than one deduction engine are found that could be used for answering the query such as deductive closure engines 129a-129n, as in step 227 of FIG. 2C, the deductive closure generator 117 extracts query results from all available engines and the results are combined by combinator 131. However, if neither the suitable engine nor any weaker engines are found, in step 231 of FIG. 2C an empty result is assigned to the query. In step 233 the extracted result to the query and a list of deduction engines used is sent to agent by query engine 111.

FIGS. 3A-3C are diagrams of an inference rule structure, in accordance with one embodiment. In FIG. 3A, an inference rule 300 includes several components, such as a name 301, premises 303, conclusions 305, unless clauses 307, assumptions 309 and logic 311. Name 301 is an identifier that is used to refer to a specific rule. Premises 303 are propositions supposed or proved as basis of inference; they are conditions that must hold for the inference rule to apply and for the inference to take place. Conclusions 305 are consequents that describe what is to hold after the inference rule has been applied and inference has taken place. Unless clauses 307 are specific non-monotonic feature and have various meanings and uses depending on the non-monotonic logic used for reasoning. These clauses 307 are sometimes known as the consistency condition or justification. Furthermore, it is necessary for an inference rule to contain properties about whether it uses either of the Open World or Closed World assumptions 309. The open world assumption (OWA) is the assumption that the truth-value of a statement is independent of whether or not it is known by any single observer or agent to be true, while the closed world assumption (CWA) holds that any statement that is not known to be true is false. Assumptions 309 are tags which relate to how certain operations, for example negation, are to be handled. OWA and CWA are two default values for assumptions 309; however other values could be present. An inference rule also needs a reasoning mechanism or logic 311 to draw conclusions 305 from premises 303 based on assumptions 309 and unless clauses 307. Logic 311 is a tag which describes which logic is to be used when interpreting a statement, for example First Order Predicate Logic (FOPL), modal logic S4 or S5, etc. Logic tag 311 is usually used when the premises 303, conclusions 305 or unless clauses 307 contain modal operators.

Languages such as Rule Markup Language (RuleML) provide a complete syntax and structure for expressing rules using Extensible Markup Language (XML) and forms of XML such as RDF/XML, which is XML syntax for Resource Description Framework (RDF). FIG. 3B shows a sample RDF description for a rule named "CD-Introduction" for introducing conclusion (d) from premise (c) with a Closed Word Assumption (CWA) and using a First Order Predicate Logic (FOPL). In this example no unless clause is used. As seen in FIG. 3B each RDF statement or RDF triple consists of a "subject" which identifies what object the triple is describing (first column in FIG. 3B), a "predicate" which defines the piece of data in the object that a value is assigned to (second column in FIG. 3B), and an "object" which is the actual value assigned (third column in FIG. 3B). The rule "CD-introduction" of FIG. 3B could be interpreted as: "In a closed world using first order predicate logic, (a) implies (b)."

FIG. 3C is another RDF rule structure similar to FIG. 3B with a difference that the logic used for reasoning in order to deduce (e) from (d) in FIG. 3C is not FOPL as for FIG. 3B but is the temporal logic "T" which can support the "necessity" condition in premise (Ld). Letter L in the rule is the unary modal operator for "Necessarily" and the main axiom for logic "T" is the inference rule (Lp→p). The rule "DE-potential introduction" of FIG. 3C could be interpreted as: "In a closed world using modal logic "T", if (d) necessarily exists then (e) will exist", meaning that the existence of (e) can be certain only if (d) certainly exists and if (d) is just probable, no deduction as for existence or non-existence of (e) can be made.

Figure 4A:
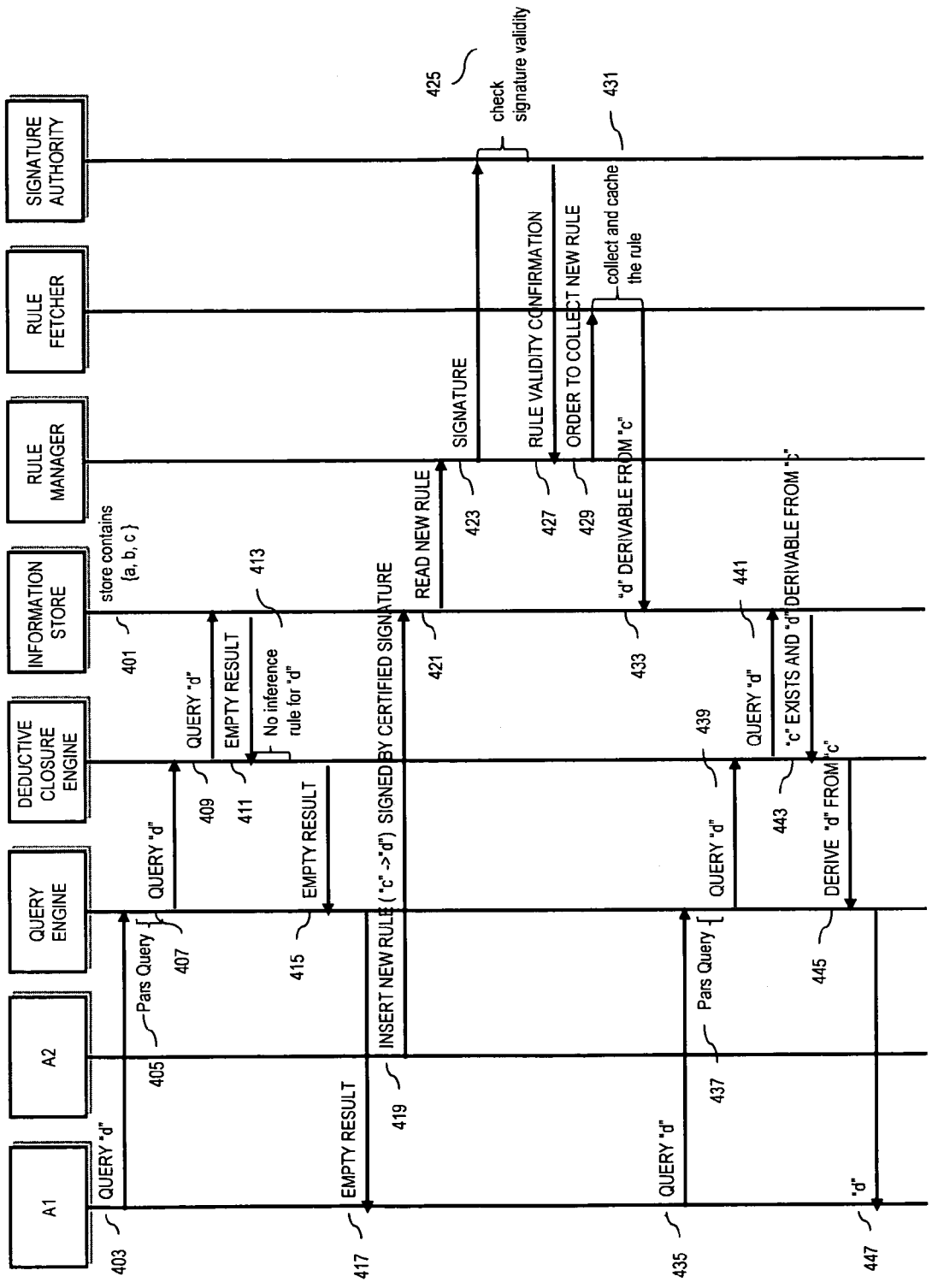
FIG. 4A is a diagram of a process for introduction of dynamic inference rules by an authorized agent, in accordance with one embodiment.

FIG. 4A is a diagram of a process for introduction of dynamic inference rules by an authorized agent, in accordance with one embodiment. It is assumed that at the start of process at step 401 information {a, b, c}, where for example each of (a), (b) and (c) can be symbols representing RDF triples, exist in the information store 107. It is also assumed that the logic used for reasoning in this example is First Order Predicate Logic (FOPL). In step 403 a query for (d) is made by agent A1. At step 405 query engine 111 receives the query and performs necessary parsing (syntactical analysis) to determine its grammatical structure with respect to a given structure. Assuming that the query structure satisfies grammatical structure, in next step 407 query engine 111 passes the query to deductive closure engine 113, and as in step 409 deductive closure engine 113 passes the query to information store 107. However, since information (d) does not exist in the information store 107, as in step 411 it returns a message to deductive closure engine 113 stating that the requested information could not be found in information store. Upon receiving the message, the deductive closure engine 113 in step 413 uses the rules to either expand upon the result or generate the query request from the available information and rules in information store 107. In this case since no rule for deducting (d) is available, the deductive closure engine 113 returns an empty result back to the query engine 111 as in step 415 and the query engine respectively forwards the message to agent A1 as in step 417.

In step 419, agent A2 inserts a new inference rule (c→d) into the information store 107 signed by a certified signature authority. This rule that will allow deduction of (d) from (c) is expressed using RDF syntax as shown in FIG. 3B. As in step 421 rule manager 119 reacts to the new rule inserted into the information store 107 and reads the rule. Rule manager 119 then passes the accompanying signature to the signature authority 103 in step 423 for evaluation. In this example the signature authority 103 confirms the validity of the rule in step 425 and signals back to the rule manager 119 as in step 427. In step 429, rule manager 119 signals the rule fetcher 121 to collect the new rule. The rule fetcher 121 collects and caches (stores) the new rule as in steps 431 and 433.

In step 435 agent A1 repeats the query for (d) that he had made in step 403. The process for steps 437, 439 and 441 are respectively the same as steps 405, 407 and 409. However, in step 443 information store 107 sends the inference rule for deducing (d) to deductive closure engine 113. The deductive closure engine 113 applies the rule and infers that (d) is derivable and returns (d) as the result to query engine 111 in step 445 and query engine passes the result to agent A1 in step 447. Although the reasoning system (logic) used as the basis for drawing the query result in this example is the First Order Predicate Logic (FOPL) which forms the basis for nearly all standard logics, but other types of predicate logic (second order predicate logic, many-sorted logic, etc.) and also non-predicate logics such as modal logic could be used for reasoning.

Figure 4B:
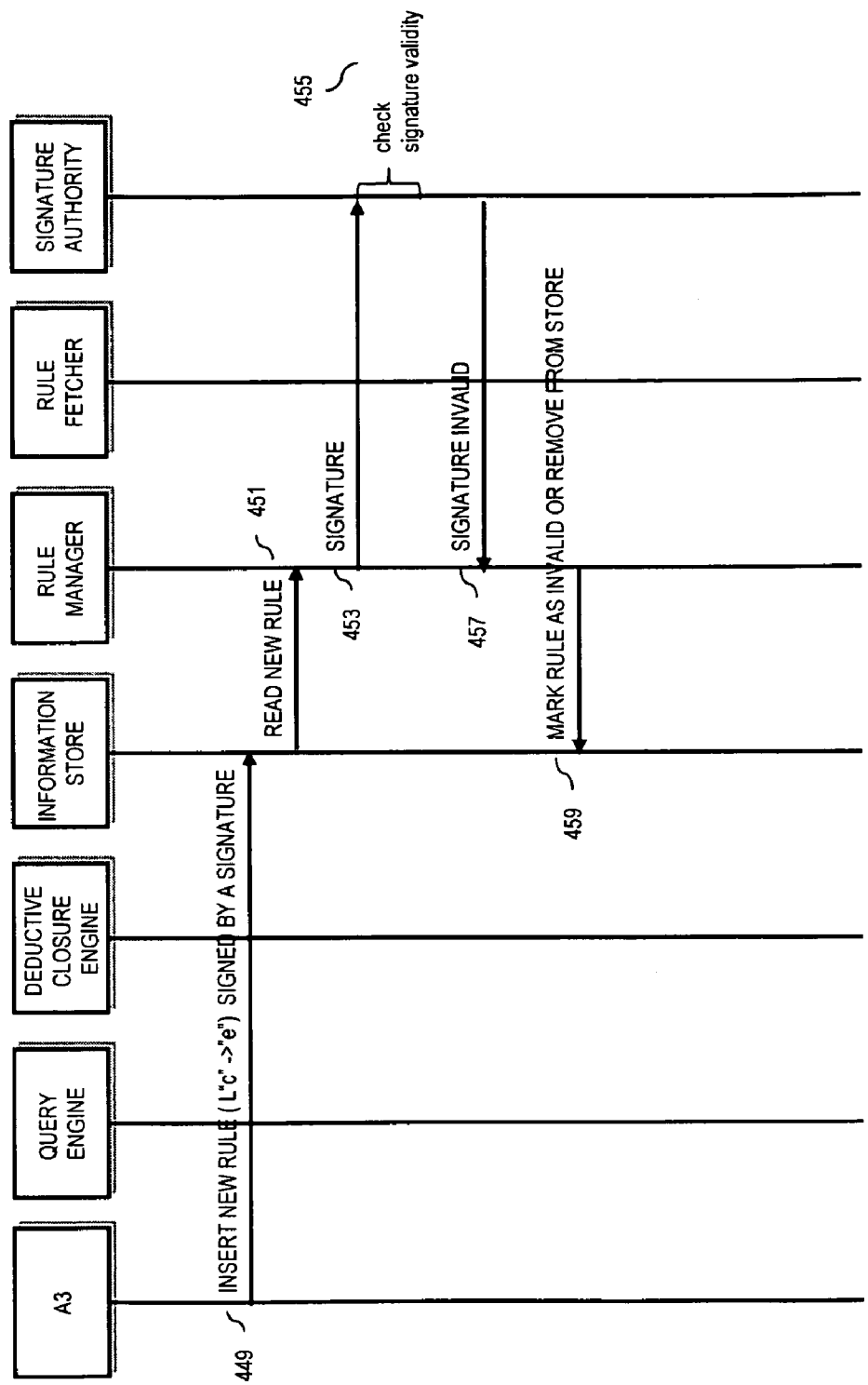
FIG. 4B is a diagram of a process for preventing introduction of dynamic inference rules by an unauthorized agent, in accordance with one embodiment.

FIG. 4B is a diagram of a process for preventing introduction of dynamic inference rules by an unauthorized agent, in accordance with one embodiment. In step 449, agent A3 inserts a new inference rule "Ld→e" into the information store 107 and signs it with a signature. The procedure of steps 451, 453 and 455 are similar to that of steps 421, 423 and 425 from FIG. 4A. However, in this example the signature certificate is invalid. As in step 457 signature authority 103 informs rule manager 119 of signature rejection. At this point, rule manager 119 will either mark the rule as invalid or explicitly remove the rule from the information store 107 as shown in step 459.

Figure 4C:
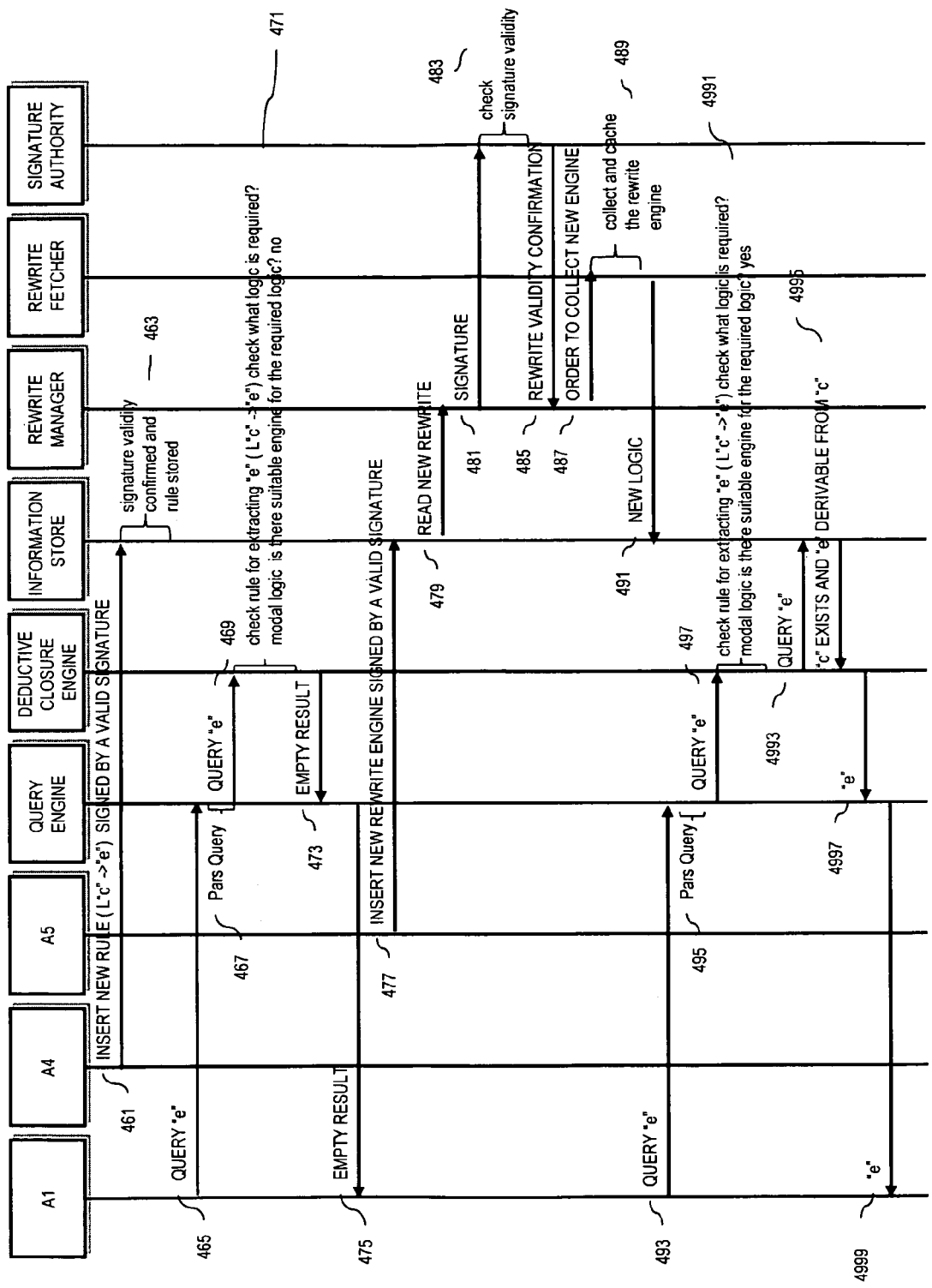
FIG. 4C is a diagram of a process for introduction of a new deduction engine (logic) by an authorized agent, in accordance with one embodiment.

FIG. 4C is a diagram of a process for introduction of a new deduction engine (logic) by an authorized agent, in accordance with one embodiment. In step 461, agent A4 inserts a new rule "Ld→e" into the information store 107 and signs it with a valid signature. Step 463 summarizes the procedure for signature validation similar to steps 421 to 427 of FIG. 4A. The RDF for this rule is described in FIG. 3C. As in step 465 agent A1 queries for "e" and the query process is started in a similar manner to what described in FIG. 4A. In step 471 where deductive closure engine 113 checks for a suitable inference rule to be used for answering this query, although the new rule inserted by agent A4 is found, however the required logic is modal logic "T" and there is no suitable deduction engine for dealing with "T" present in deductive closure engine 113. In this case an empty result is returned to agent A1 in steps 473 and 475. In step 477, agent A5 inserts a new rewrite engine into the information store 107. A rewrite engine is a set of codes and descriptions for reasoning based on certain logic. The rewriter manager 123 and rewrite fetcher 125 are basically analogous to rule manager 119 and rule fetcher 121 respectively. Steps 479 to 491 for rewrite signature authorization, rewrite engine collection and storing are equivalent of steps 421 to 433 for rule signature authorization and rule collection and storing. In step 493 agent A1 once again repeats his query for "e" and the process of steps 495 and 497 are applied in a similar manner to steps 467 and 469. In Step 497 the deductive closure engine 113 receives the rule and in step 4991 checks what logic is required for answering this query. The required logic in this example is modal logic "T" and a rewrite engine for handling this logic was introduced by agent A5 and is available. Deductive closure engine 113 passes the query to information store 107 as in step 4993 and the information store 107 infers that "e" can be deducted from (c) based on the content of new rewrite engine. This result is returned to agent A1 through steps 4997 and 4999.

In the above examples, combinator 131, a component of deductive closure generator 117, would additionally pass the result back for the result to be further processed if necessary. This would occur when the required logic does not exist in the system and a weaker logic is used instead or in cases where deduction requires many passes. The combinator effectively contains the decision procedures to check whether the application of rules has effectively terminated or not.

For example, if agent A6 removes the information about logic "T" from the information store 107, rewriter manager 119 and rewriter fetcher 125 will work to modify the information store 107 accordingly. Now if agent A6 inserts a new rewrite engine into the system for modal logic "K" (a weaker modal logic than "T") again rewriter manager 119 and rewriter fetcher 125 will validate and store the new logic in the system. Logic "K" is weaker than logic "T" because it does not have the Lp→p axiom. The axiom of "K" is L(p→q)
→(Lp→Lq). At this stage if agent A1 queries for "e" in a similar manner to that already described, when deductive closure engine 113 receives the rewrite engine it checks what logic is required and in this instance notices that the modal logic "T" is required. Since the suitable logic is not available, deductive closure engine 113 checks to see what other query engines are available, and in this instance select the next weakest engine "K". The system "K" generates two results: an empty result and one with "e" as a result. The Combinator 131 receives both results and returns them both to the query engine 111 with an explanation of the deduction. As an example, the returned result could be as follows:

The required system "T" was not found

Two results were found using system "K"

Result 1={ }

Result2="e"

Ultimately, combinator 131 passes the final result(s) to query engine 111.

The processes described herein for dynamic modification of inference rules and deduction engines in an information system may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
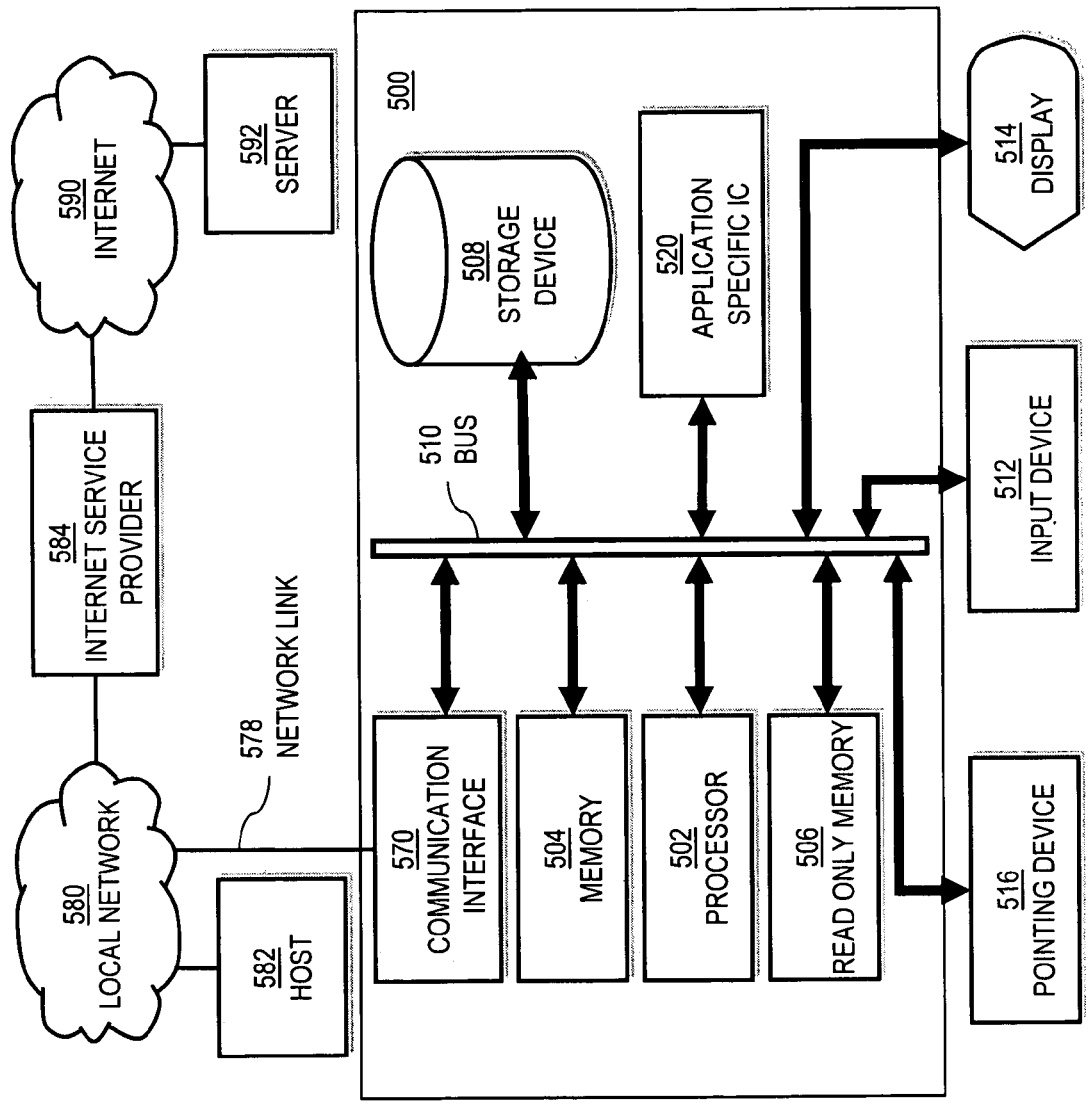
FIG. 5 is a diagram of hardware that can be used to implement an embodiment of the invention.

FIG. 5 illustrates a computer system 500 upon which an embodiment of the invention may be implemented. Computer system 500 includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 510 includes one or more parallel conductors of information so that information is transferred quickly among devices coupled to the bus 510. One or more processors 502 for processing information are coupled with the bus 510.

A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a transmission medium such as a cable or carrier wave, or any other medium from which a computer can read. Information read by a computer from computer-readable media are variations in physical expression of a measurable phenomenon on the computer readable medium. Computer-readable storage medium is a subset of computer-readable medium which excludes transmission media that carry transient man-made signals.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server host 592 connected to the Internet hosts a process that provides a service in response to information received over the Internet. For example, server host 592 hosts a process that provides information representing video data for presentation at display 514.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
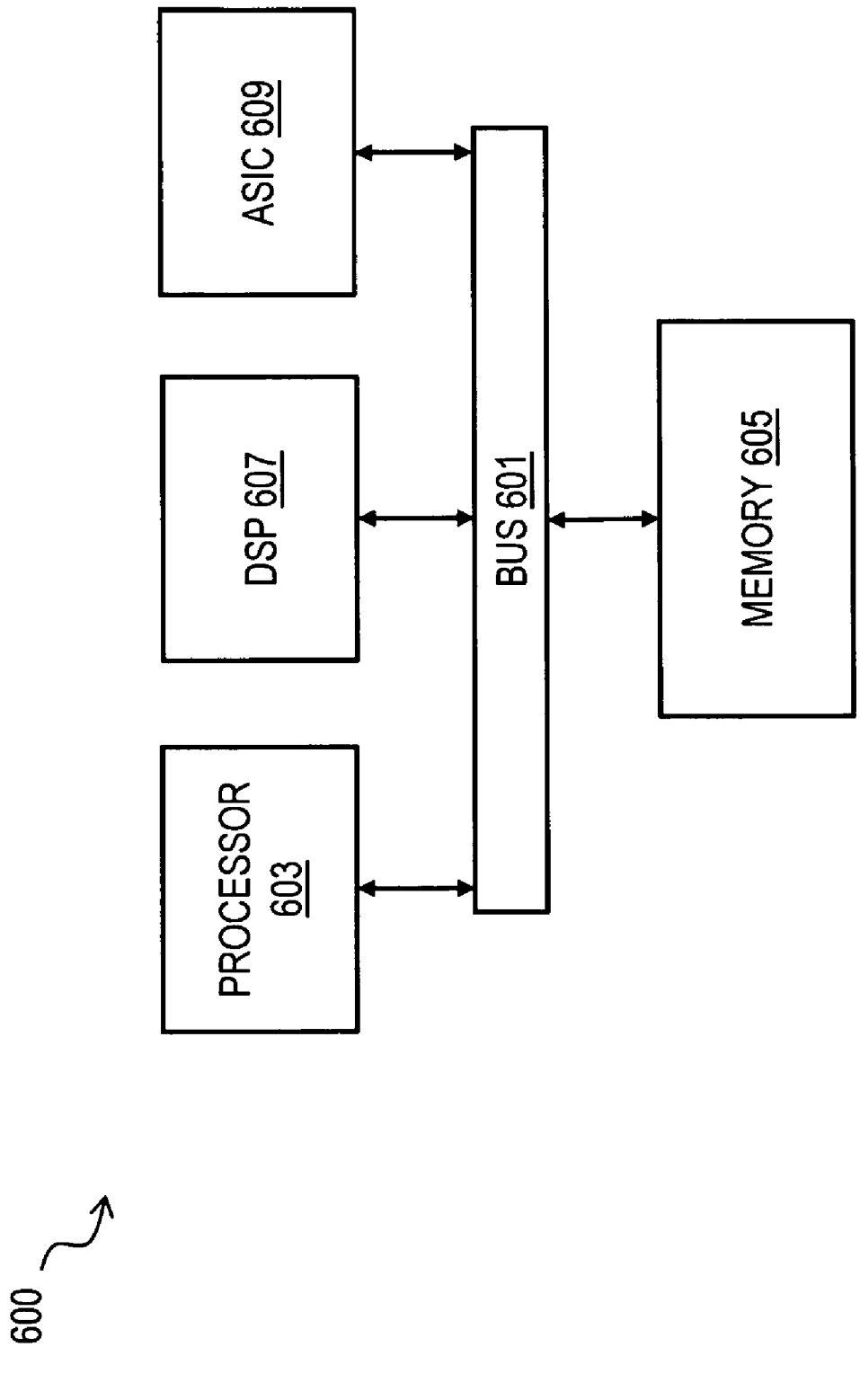
FIG. 6 is a diagram of a chip set that can be used to implement an embodiment of the invention.

FIG. 6 illustrates a chip set 600 upon which an embodiment of the invention may be implemented. Chip set 600 is programmed to carry out the inventive functions described herein and includes, for instance, the processor and memory components described with respect to FIG. 6 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein. The memory 605 also stores the data associated with or generated by the execution of the inventive steps.

Figure 7:
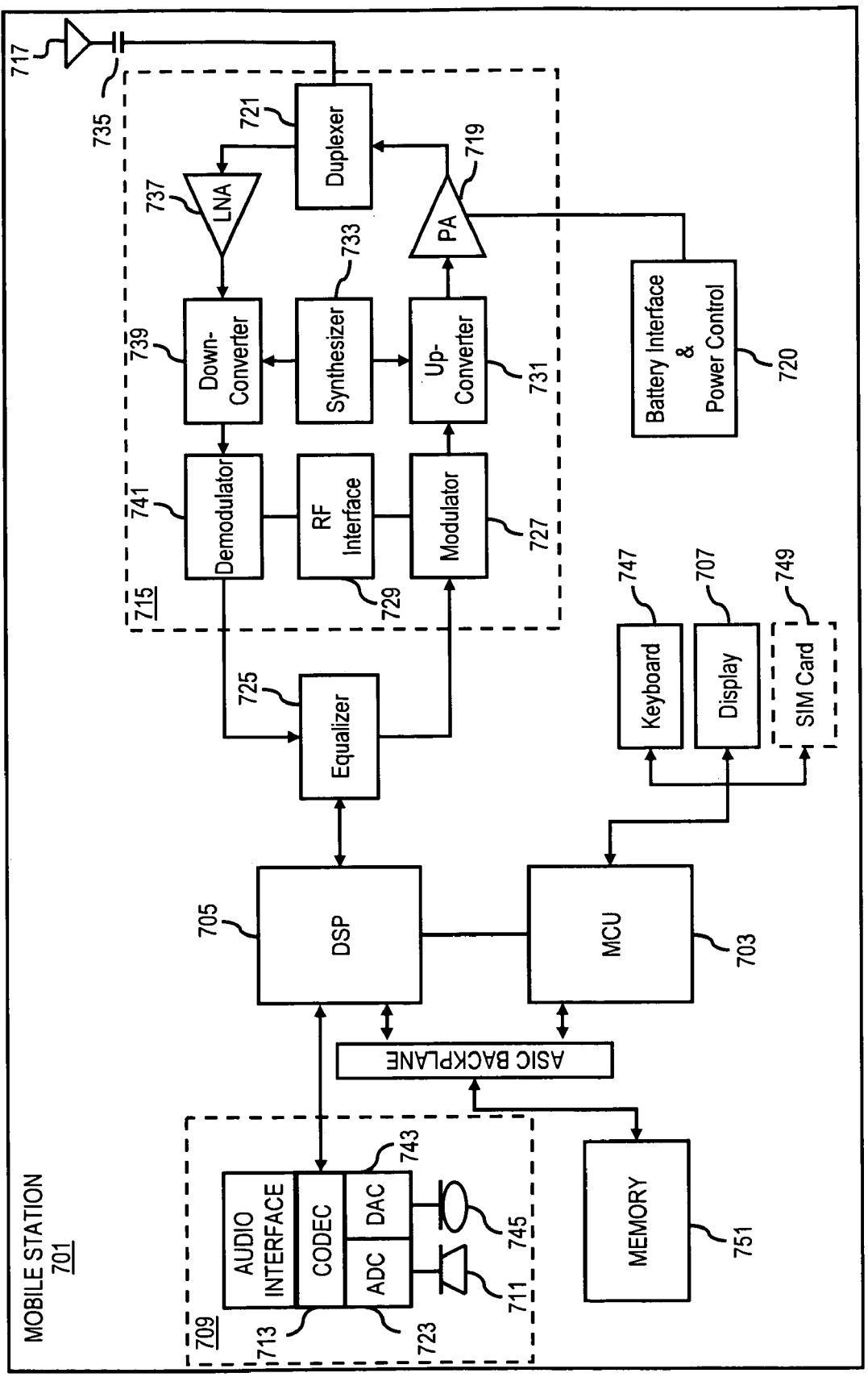
FIG. 7 is a diagram of a terminal that can be used to implement an embodiment of the invention.

FIG. 7 is a diagram of example components of a mobile station (e.g., handset) capable of operating in the system of FIG. 1A, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the station include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile station functions. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile station 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In the example embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The MCU 703 delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the station. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile station 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile station 701 on a radio network. The card 749 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a new inference rule or new deduction engine signed by an agent using a signature;
   validating the signature of the agent; and
   dynamically inserting the new inference rule or the new deduction engine if the signature is valid.

2. A method of claim 1, wherein the new inference rule or the new deduction engine is among a plurality of inference rules or deduction engines, the method further comprising:
   receiving a request to remove one of the inference rules or the deduction engines.

3. A method of claim 1, wherein the insertion of the new inference rule or the new deduction engine is initiated by an application programming interface.

4. A method of claim 1, wherein the rule has a structure specifying a name, a premise, a conclusion, unless clause, assumption, logic, or a combination thereof.

5. A method of claim 4, wherein the assumption has values including an open world or a closed world.

6. A method of claim 4, further comprising:
   determining whether the logic is available; and
   if the logic is not available, selecting a weaker logic.

7. A method of claim 6, wherein the weaker logic yields multiple results with associated descriptions of respective deduction engines utilized.

8. An apparatus comprising:
   at least one processor; and
   at least one memory including computer program code,
   the at least one memory and the computer program code configured to, with the at least one processor, cause the apparatus to perform at least the following,
   receive a new inference rule or new deduction engine signed by an agent using a signature;
   validate the signature of the agent; and
   dynamically insert the new inference rule or the new deduction engine if the signature is valid.

9. An apparatus of claim 8, wherein the new inference rule or the new deduction engine is among a plurality of inference rules or deduction engines, the apparatus being further caused to:

receive a request to remove one of the inference rules or the deduction engines.

10. An apparatus of claim 8, wherein the insertion of the new inference rule or the new deduction engine is initiated by an application programming interface.

11. An apparatus of claim 8, wherein the rule has a structure specifying a name, a premise, a conclusion, unless clause, assumption, logic, or a combination thereof.

12. An apparatus of claim 11, wherein the assumption has values including an open world or a closed world.

13. An apparatus of claim 11, wherein the apparatus is further caused to:
 determine whether the logic is available; and
 if the logic is not available, select a weaker logic.

14. An apparatus of claim 13, wherein the weaker logic yields multiple results with associated descriptions of respective deduction engines utilized.

15. A computer-readable storage medium carrying one or more sequences of one or more instructions which, when executed by one or more processors, cause an apparatus to perform at least the following:
 receive a new inference rule or new deduction engine signed by an agent using a signature;
 validate the signature of the agent; and
 dynamically insert the new inference rule or the new deduction engine if the signature is valid.

16. A computer-readable storage medium of claim 15, wherein the new inference rule or the new deduction engine is among a plurality of inference rules or deduction engines, the apparatus being further caused to:
 receive a request to remove one of the inference rules or the deduction engines.

17. A computer-readable storage medium of claim 15, wherein the insertion of the new inference rule or the new deduction engine is initiated by an application programming interface.

18. A computer-readable storage medium of claim 15, wherein the rule has a structure specifying a name, a premise, a conclusion, unless clause, assumption, logic, or a combination thereof.

19. A computer-readable storage medium of claim 18, wherein the assumption has values including an open world or a closed world.

20. A computer-readable storage medium of claim 18, wherein the apparatus is further caused to:
 determine whether the logic is available; and
 if the logic is not available, select a weaker logic, wherein the weaker logic yields multiple results with associated descriptions of respective deduction engines utilized.

* * * * *